(12) United States Patent
Fujisaki

(10) Patent No.: US 10,976,568 B1
(45) Date of Patent: Apr. 13, 2021

(54) CAMERA DEVICE WITH HAND SHAKE CORRECTION FUNCTION

(71) Applicant: AAC Optics Solutions Pte. Ltd., Singapore (SG)

(72) Inventor: Yoshifumi Fujisaki, Osaka (JP)

(73) Assignee: AAC Optics Solutions Pte. Ltd., Singapore (SG)

( * ) Notice: Subject to any disclaimer, the term of this patent is extended or adjusted under 35 U.S.C. 154(b) by 0 days.

(21) Appl. No.: 16/790,680

(22) Filed: Feb. 13, 2020

(30) Foreign Application Priority Data

Dec. 27, 2019 (JP) .............................. JP2019-239825

(51) Int. Cl.
*G02B 27/64* (2006.01)
*H04N 5/232* (2006.01)
*H04N 5/225* (2006.01)

(52) U.S. Cl.
CPC ......... *G02B 27/646* (2013.01); *H04N 5/2254* (2013.01); *H04N 5/23287* (2013.01); *H04N 5/23296* (2013.01)

(58) Field of Classification Search
None
See application file for complete search history.

(56) References Cited

U.S. PATENT DOCUMENTS

| | | | | | |
|---|---|---|---|---|---|
| 5,907,353 | A | * | 5/1999 | Okauchi | H04N 1/00795 348/218.1 |
| 2006/0127073 | A1 | * | 6/2006 | Yasuda | H04N 5/23248 396/55 |
| 2007/0031134 | A1 | * | 2/2007 | Kuroda | G02B 13/0035 396/55 |
| 2007/0279743 | A1 | * | 12/2007 | Kushida | G02B 15/144113 359/557 |
| 2007/0279765 | A1 | * | 12/2007 | Takahashi | H04N 5/23287 359/697 |
| 2008/0080053 | A1 | * | 4/2008 | Homme | H04N 5/23248 359/554 |
| 2010/0195996 | A1 | * | 8/2010 | Hagiwara | G03B 5/02 396/85 |
| 2014/0086569 | A1 | * | 3/2014 | Nomura | G02B 27/646 396/55 |
| 2014/0218798 | A1 | * | 8/2014 | Suzuka | G02B 13/0015 359/557 |
| 2016/0170189 | A1 | * | 6/2016 | Fujimoto | G02B 15/163 359/557 |
| 2018/0024329 | A1 | * | 1/2018 | Goldenberg | G02B 7/09 359/557 |

(Continued)

*Primary Examiner* — William B Perkey
(74) *Attorney, Agent, or Firm* — W&G Law Group LLP

(57) ABSTRACT

The present invention provides a camera device with an anti-shake mechanism and a deflection optical system, which does not deteriorate image performance due to movement of the lens. An optical system includes, from an object side, a reflecting part configured to deflect an optical axis, imaging lens sets, and an imaging element. Image shake of an axis perpendicular to a plane formed by an optical axis of the imaging lens sets and a reflected optical axis of the object side by the reflecting part is corrected by rotation of the reflecting part. Image shake of an axis that is parallel to the reflected optical axis of the object side is corrected by moving the imaging lens sets including the zoom optical system as a whole along a direction perpendicular to the optical axis of the imaging lens sets.

14 Claims, 17 Drawing Sheets

(56) References Cited

U.S. PATENT DOCUMENTS

| | | | | |
|---|---|---|---|---|
| 2018/0239162 A1* | 8/2018 | Lee | .................... | H04N 5/2328 |
| 2019/0004328 A1* | 1/2019 | Lee | .................... | G02B 7/1821 |
| 2019/0129197 A1* | 5/2019 | Kim | ...................... | G03B 5/00 |
| 2019/0377155 A1* | 12/2019 | Bachar | ................ | H04N 5/2254 |
| 2020/0057313 A1* | 2/2020 | Lee | .................... | H02K 11/215 |
| 2020/0137274 A1* | 4/2020 | Lee | ................... | G02B 13/0065 |
| 2020/0174270 A1* | 6/2020 | Enta | ...................... | H04N 5/225 |
| 2020/0310149 A1* | 10/2020 | Kazuo | ................. | G02B 27/646 |

\* cited by examiner

CAMERA DEVICE WITH HAND SHAKE CORRECTION FUNCTION

TECHNICAL FIELD

The present invention relates to a camera device with a hand shake correction function.

BACKGROUND

With rapid development of cameras technologies, lens driving devices are widely used in various camera devices. It is particularly accepted by consumers to apply the lens driving devices into various portable electronic devices, such as a mobile phone, a tablet computer, etc.

A driving mechanism of the lens driving device suitable for a general portable electronic device is generally formed by a coil and a magnet, and the coil is fixed to an outer periphery of a carrier of the lens. When an electric current is applied to the coil, the coil moves the carrier of the lens and therefore move along a direction of an optical axis of the lens under an effect of an electromagnetic force, thereby enabling focusing. Moreover, when a user holds an electronic device with his/her hand for photographing, shake of the lens driving device caused by shake of the hand can be corrected by driving in a direction perpendicular to the optical axis. However, for example, for small-sized optical devices mounted on a portable electronic device, it is difficult for a zoom optical system having a long total optical length to be directly mounted onto the portable electronic device, and a structure such as a deflection structure is required.

For the optical system using a deflection structure, shake correction is achieved sometimes by rotating a prism for deflecting light about two axes. However, when rotation is performed about an axis parallel to the optical axis of an incident surface of the prism, sometimes a surrounding image will rotate and thus an anti-shake effect cannot be obtained.

Therefore, with a configuration in which the prism is rotated only in an axial direction respectively perpendicular to an optical axis of the entrance surface of the prism and an optical axis of the imaging lens sets while blur correction in another axis direction is achieved by moving all the imaging lenses, the correction effect can be improved.

However, in an imaging lens having a zoom optical system, in order to move the imaging lenses as a whole, a structure including a motor used as a driving source for a zooming operation must be operated, which results in a significant increase in weight.

The present invention provides a hand shake correction mechanism, which can move the imaging lens sets containing the zoom optical system as a whole without assembling a motor having a large weight into the structure of the hand shake correction operation.

SUMMARY

Problem to be Solved

The present invention has been made in view of the above-mentioned problem, and an object thereof is to provide an anti-shake mechanism which is space-saving without increasing the weight when used for hand shake correction of the camera device having a deflection optical system.

Solutions to the Problem

The object of the present invention is achieved as follows. Moreover, in the following description, in order to better illustrate the present invention, the numerals and the like in the drawings are labeled in parentheses, but the constituent elements of the present invention are not limited to these labeled elements, and those skilled in the art shall interpret them broadly within a technically understandable range.

The present invention is characterized in that a camera device in which an image shake suppression action is performed by optical elements constituting the imaging optical system according to shake applied to the imaging optical system is configured as follows. The reflecting part is disposed closer to the object side than the imaging lens sets. Image shake of an axis perpendicular to a plane formed by an optical axis of the imaging lens sets and a reflected optical axis of the object side by the reflecting part is corrected by rotation of the reflecting part. Image shake of an axis that is parallel to the reflected optical axis of the object side is corrected by moving the imaging lens sets containing the zoom optical system as a whole toward a direction perpendicular to the optical axis of the imaging lens sets.

The imaging lens sets are held at a holding frame, and the holding frame can move in a direction perpendicular to the optical axis of the imaging lens sets by an electromagnetic actuator. The lens set constituting the zoom in the imaging lens sets is movable in parallel with the optical axis of the imaging lens sets by a motor.

The motor is not fixed to the above-mentioned holding frame.

The motor includes a nut part for moving the imaging lens set constituting the zoom in parallel with the optical axis, and the nut part abuts against an abutting portion of an imaging lens set frame that holds the imaging lens set through a roller part for reducing friction.

Effects

In the imaging lenses having a zoom optical system, in order to move the imaging lenses as a whole, a structure including a motor used as a driving source for zooming operation must be operated, resulting in a significant increase in weight. In contrast, in the present invention, the imaging lens sets including the zoom optical system can be moved as a whole without assembling a motor having a large weight into a structure of the hand shake correction operation. Therefore, it is possible to provide a camera device that avoids an increase in dimension of the device and has good image quality.

DESCRIPTION OF EMBODIMENTS

Figure 1:
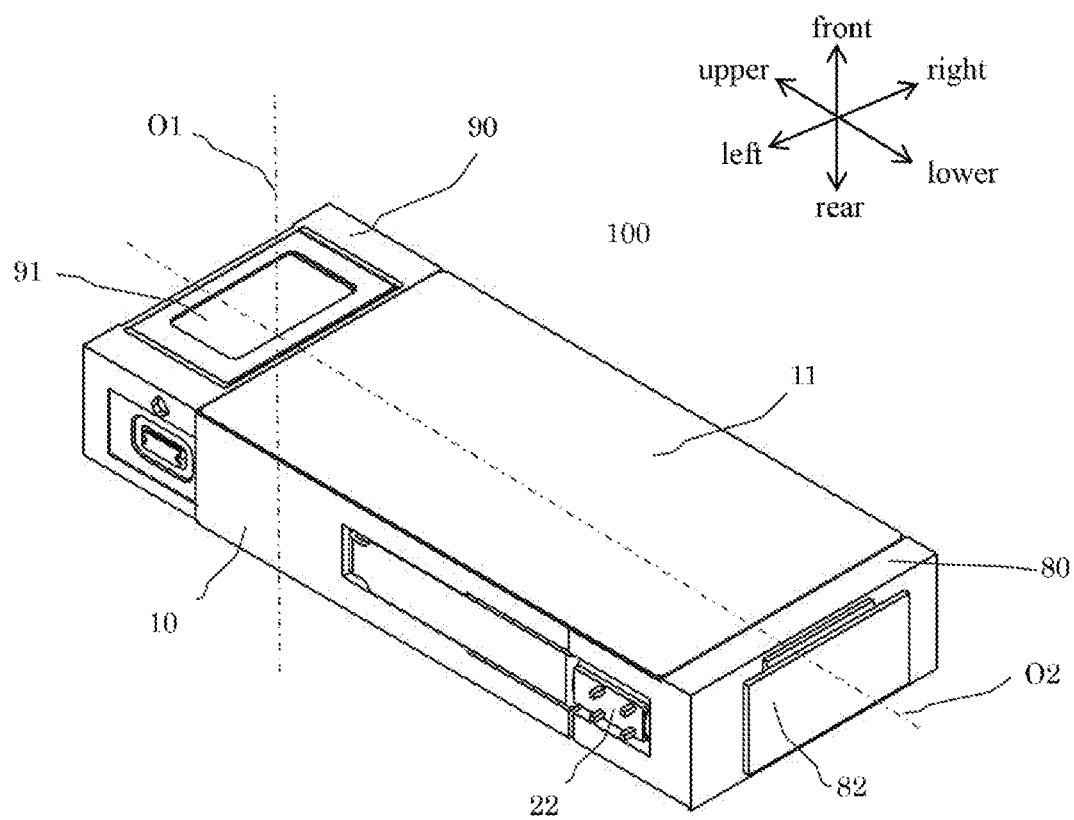
FIG. 1 is an isometric view of a camera device as viewed from the lower according to an embodiment of the present invention.
Figure 2:
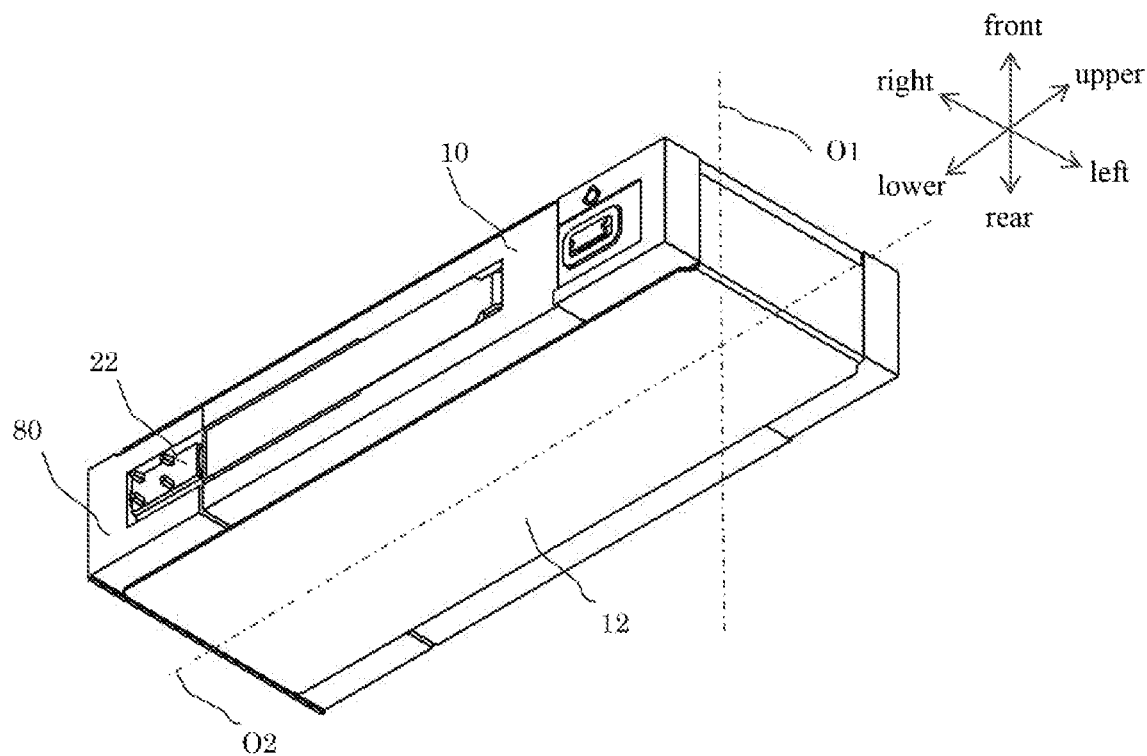
FIG. 2 is an isometric view of a camera device as viewed from the top according to an embodiment of the present invention.
Figure 3:
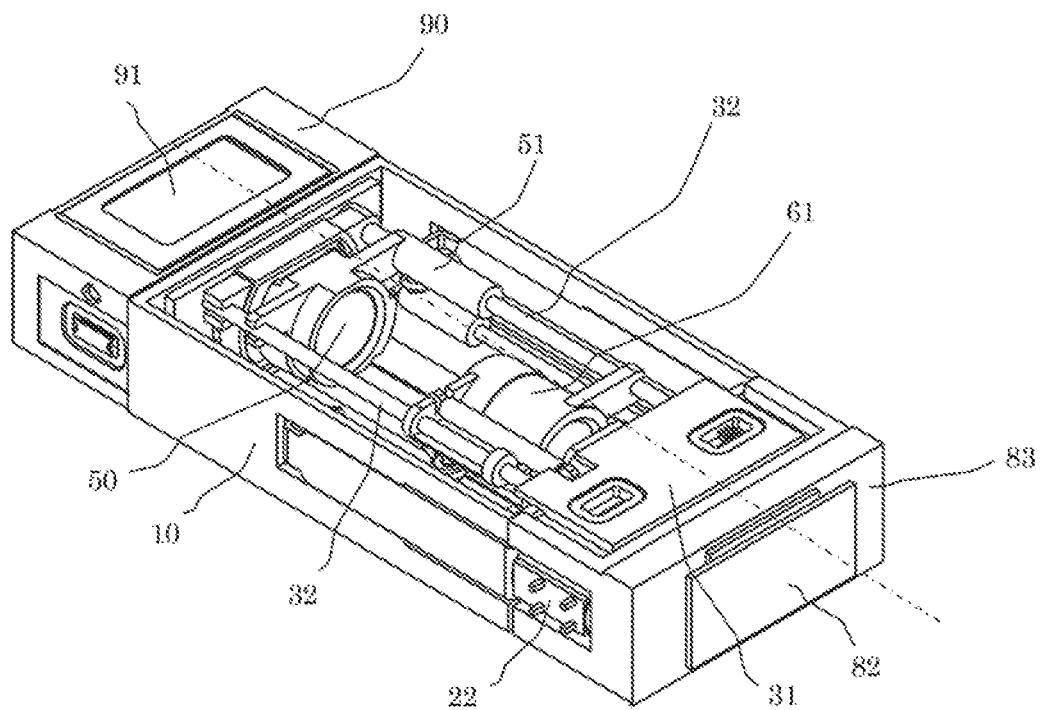
FIG. 3 is an isometric view of a camera device as viewed from the lower, with a front side cover plate and a rear side cover plate being removed according to an embodiment of the present invention.
Figure 4:
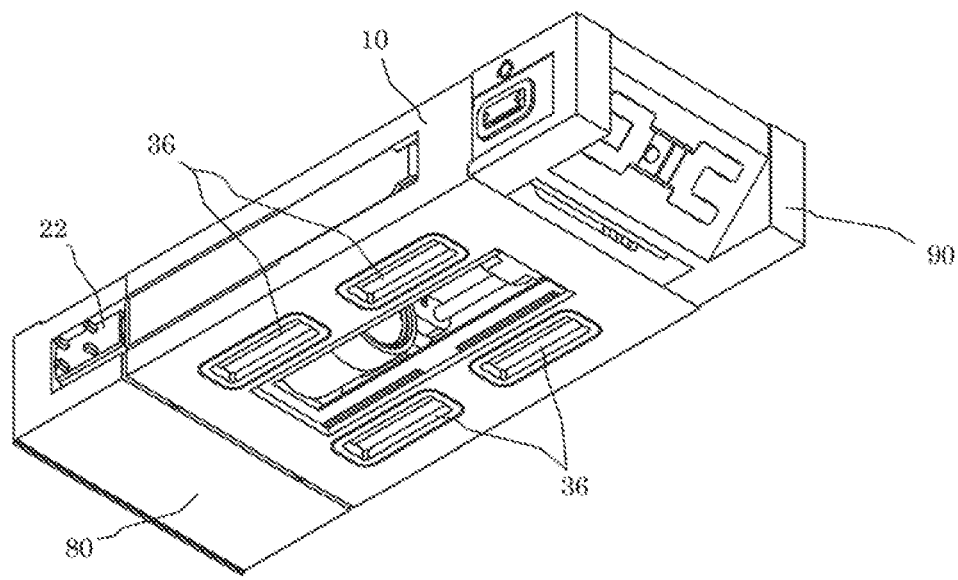
FIG. 4 is an isometric view of a camera device as viewed from the top, with a front side cover plate and a rear side cover plate being removed according to an embodiment of the present invention.

Hereinafter, the present invention will be described in detail with reference to the accompanying drawings.

FIG. 1 to FIG. 24 are diagrams showing camera devices 100 according to the present invention.

FIG. 1 to FIG. 24 show camera devices and constituent elements thereof according to the embodiments of the present invention.

As shown in FIG. 1 to FIG. 10, an imaging optical system of the camera device 100 with a hand shake correction function becomes a deflection optical system that performs hand shake correction according to shake applied to the optical system. The optical system includes: from an object side, a prism 91 as a reflecting part, a first lens set 40, a second lens set 50, a third lens set 60, a fourth lens set 70, and an imaging element 81, and a light beam is reflected by the prism 91.

In this embodiment of the present invention, the reflecting member, that is, the prism 91 is disposed closer to the object side than the imaging lens sets. Image shake of an axis (i.e., a first axis) perpendicular to a plane formed by an optical axis O2 of the imaging lens set unit 10 and a reflected optical axis O1 of the object side by the reflecting part (i.e., the prism 91) is corrected by rotation of the reflecting part (i.e., the prism 91). Image shake of an axis (i.e., a second axis) that is parallel to the reflected optical axis of the object side is corrected by moving the imaging lens set unit 10 including the zoom optical system as a whole toward a direction perpendicular to the optical axis O2 of the imaging lens set unit 10.

The imaging lens set unit 10 is held by a holding frame that can move in a direction perpendicular to the optical axis O2 of the imaging lens set unit by an electromagnetic actuator. The lens sets constituting the zoom in the imaging lens set unit 10 can move parallel to the optical axis O2 of the imaging lens set unit 10 by a motor.

The first lens set 40, the second lens set 50, the third lens set 60, and the fourth lens set 70 constitute the imaging lens set unit 10, and can be fixed to respective holding frames. In a case of moving the imaging lens set unit 10 as a whole, a motor has to be moved in the prior art because of the zoom structure. However, the motor is very heavy, which leads to increase of a dimension of the electromagnetic actuator. In this embodiment of the present invention, the zoom motor is not fixed to the holding frame, thereby achieving light weight.

Figure 11:
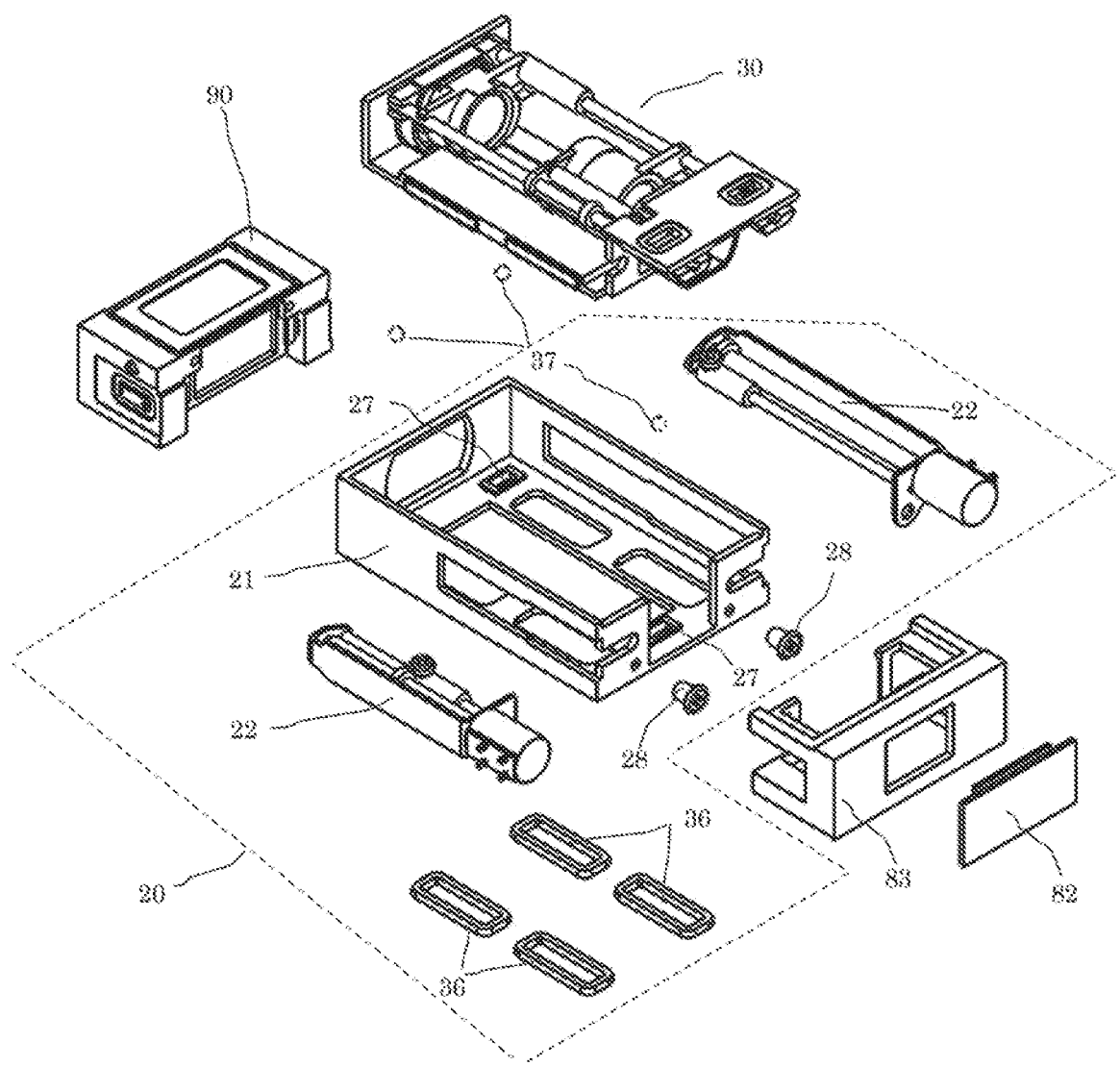
FIG. 11 is an isometric exploded view of a camera device as viewed from the lower according to an embodiment of the present invention.
Figure 12:
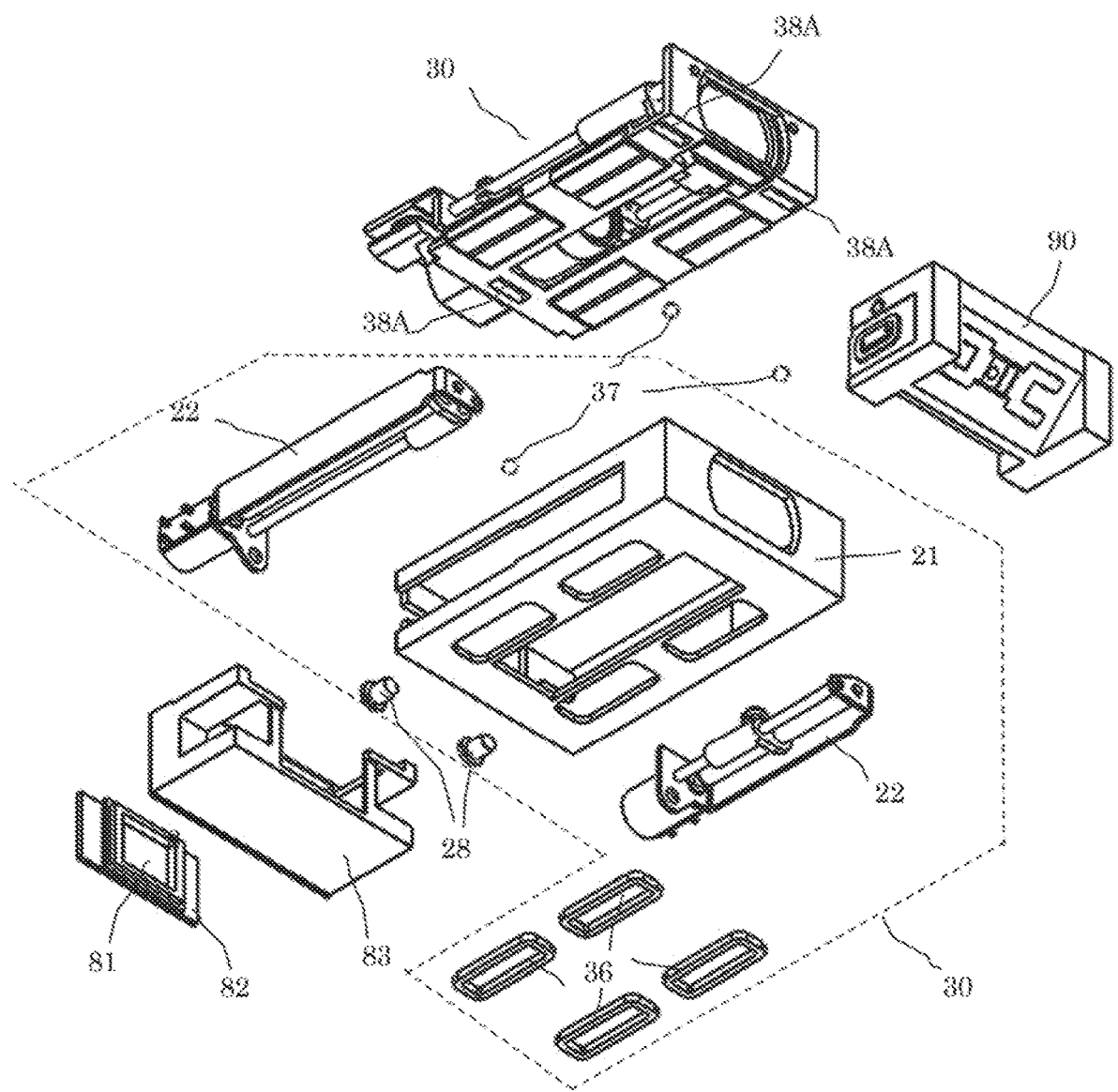
FIG. 12 is an isometric exploded view of a camera device as viewed from the top according to an embodiment of the present invention.
Figure 13:
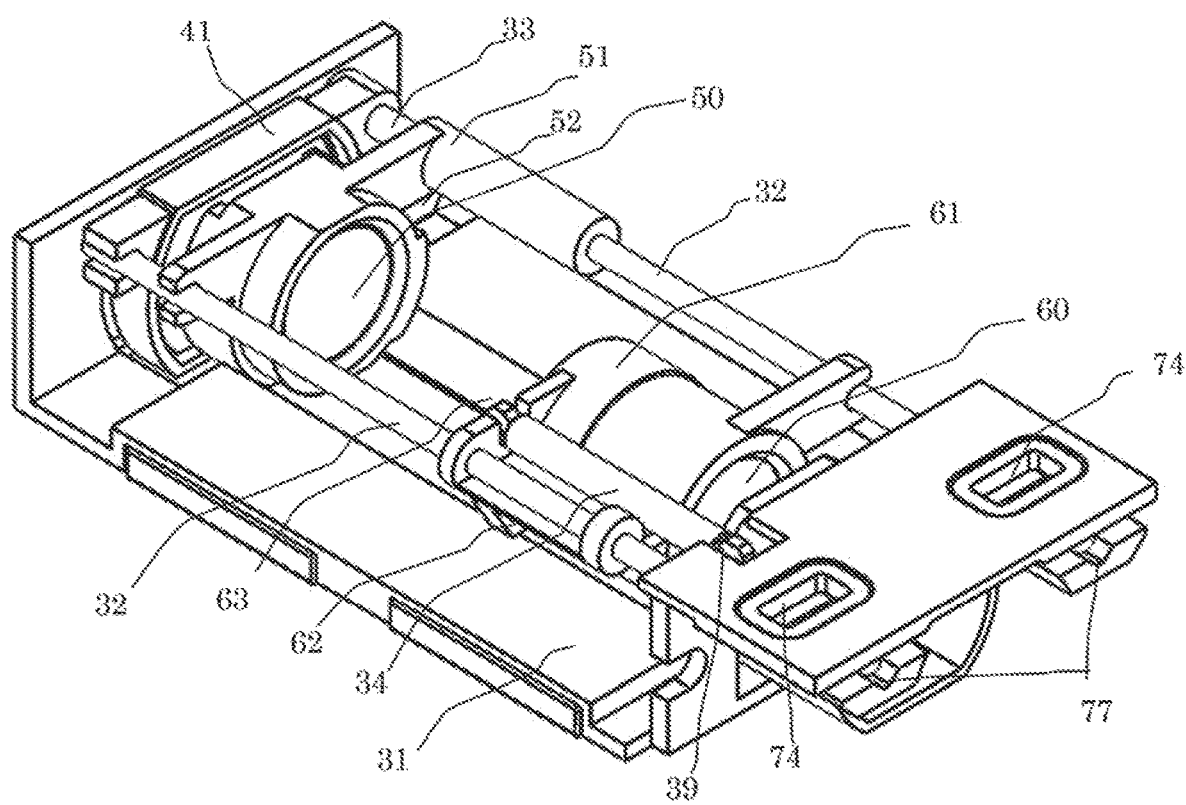
FIG. 13 is an isometric exploded view of an imaging lens set holder unit of a camera device as viewed from the lower front according to an embodiment of the present invention.
Figure 14:
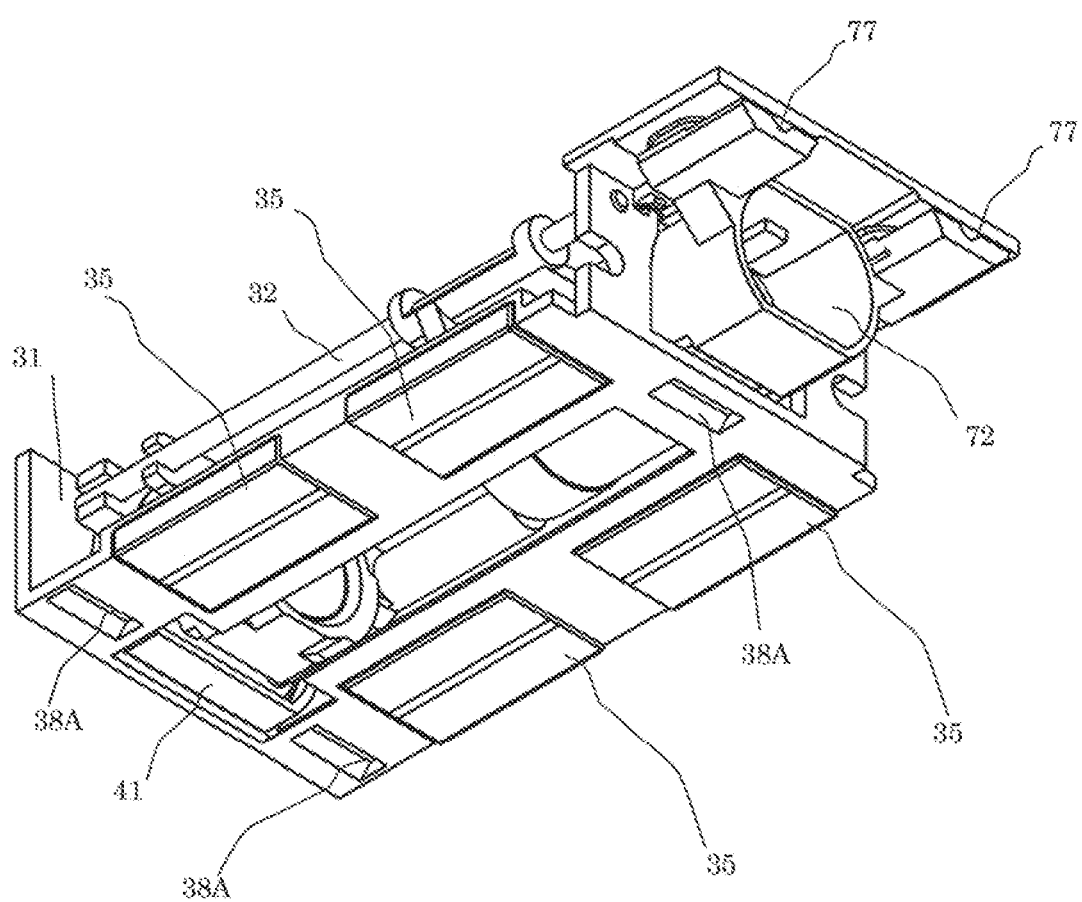
FIG. 14 is an isometric exploded view of an imaging lens set holder unit of a camera device as viewed from the lower rear according to an embodiment of the present invention.
Figure 15:
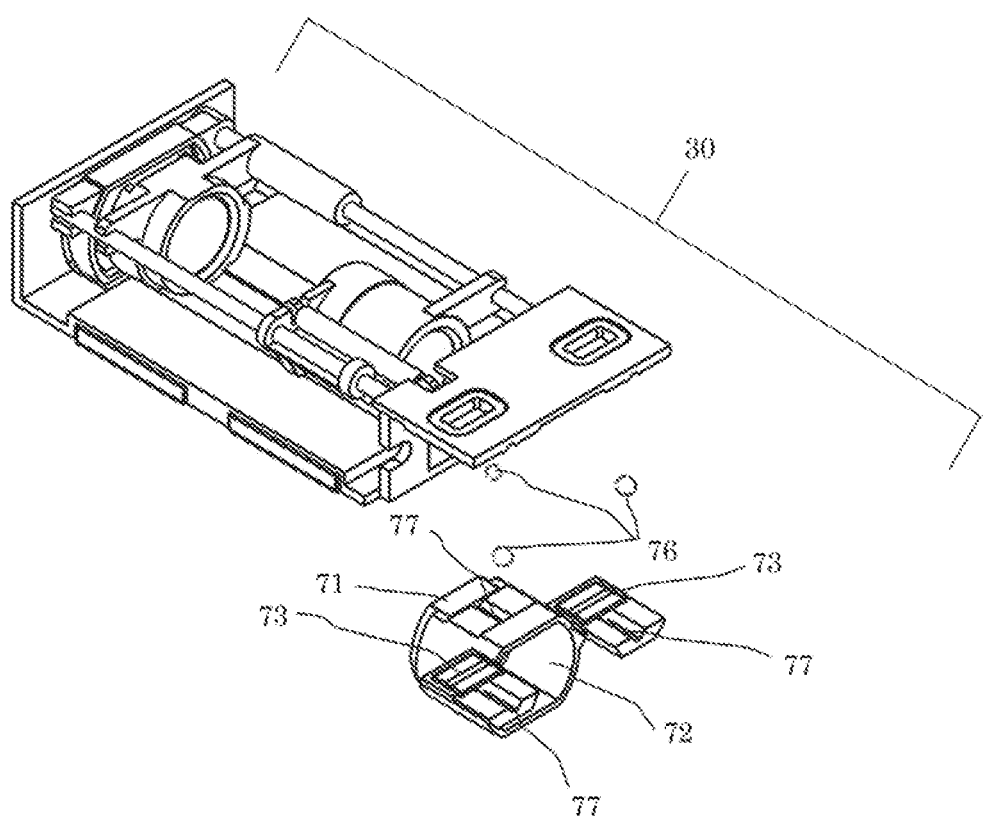
FIG. 15 is an isometric exploded view of a fourth lens set of an imaging lens set holder unit of a camera device as viewed the from lower front according to an embodiment of the present invention.
Figure 16:
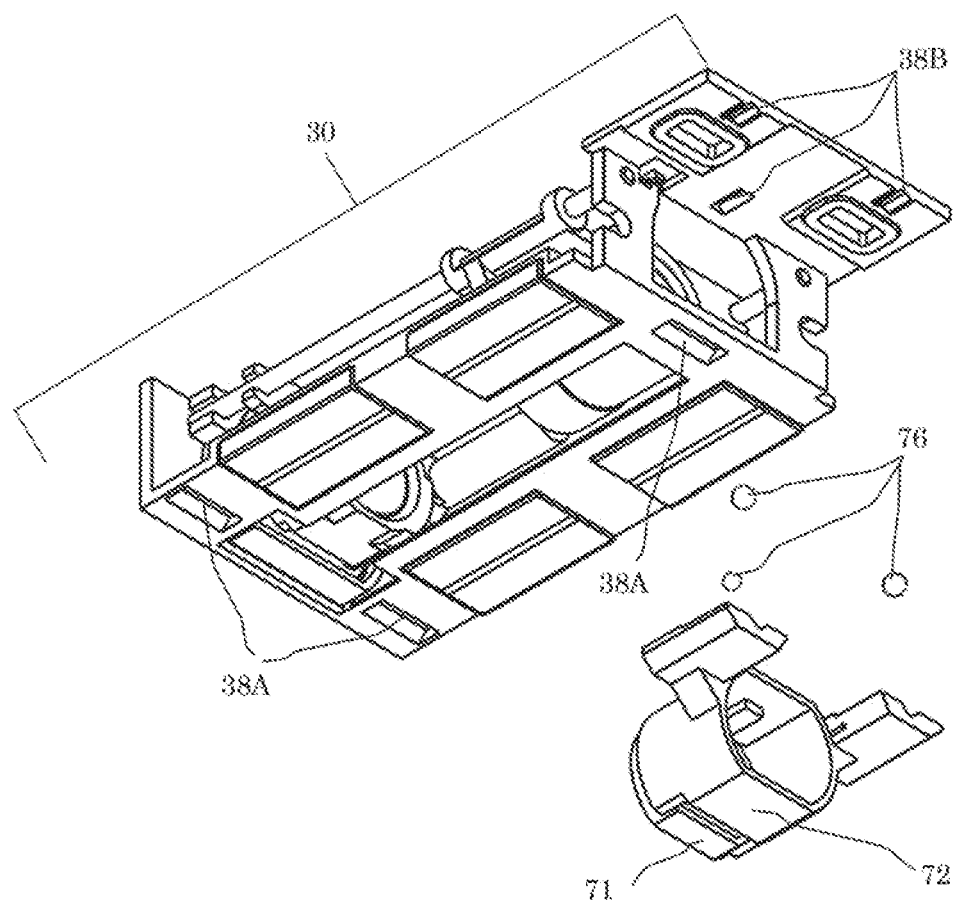
FIG. 16 is an isometric exploded view of a fourth lens set of an imaging lens set holder unit of a camera device as viewed from the lower rear according to an embodiment of the present invention.
Figure 17:
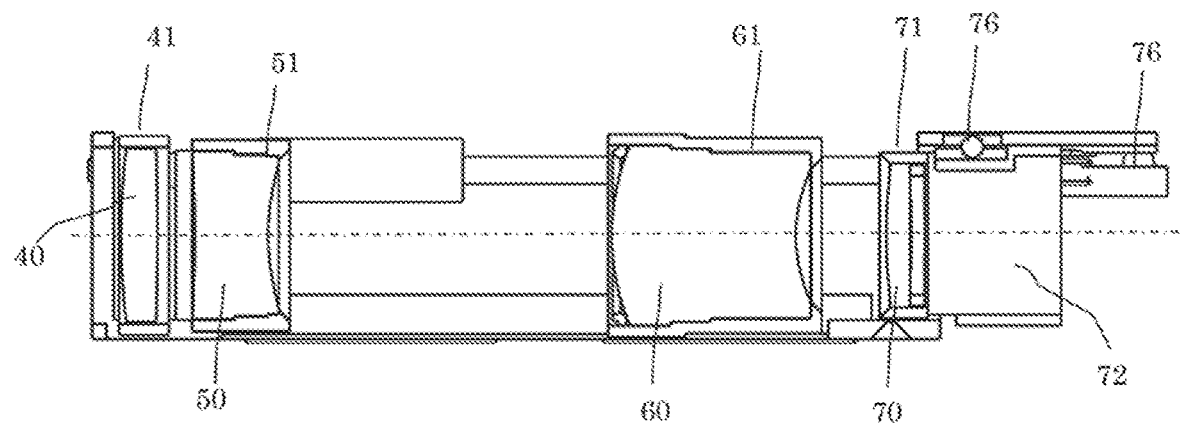
FIG. 17 is a cross-sectional view of an imaging lens set holder unit of an camera device in a cross-sectional plane formed by a first optical axis and a second optical axis according to an embodiment of the present invention.
Figure 18:
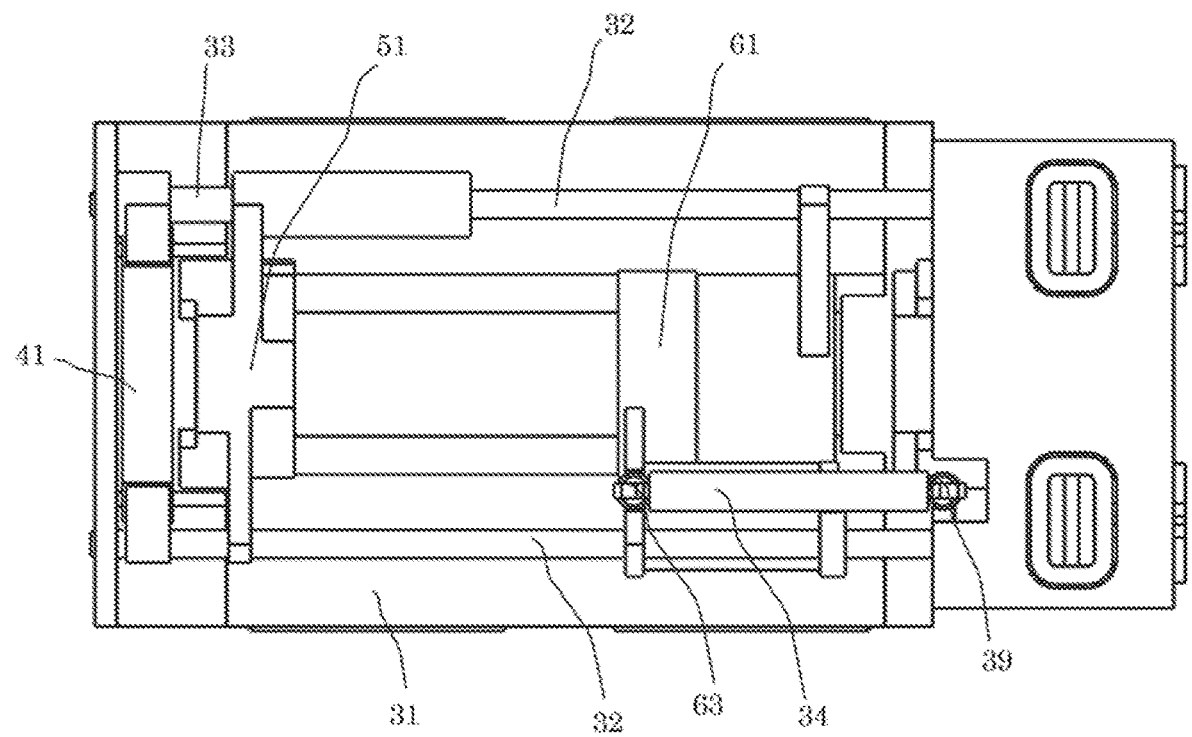
FIG. 18 is a view of an imaging lens set holder unit of a camera device as viewed from the front according to an embodiment of the present invention.

In a specific embodiment, referring to FIG. 11 and FIG. 12, the motor is a stepping motor 22.

A light beam which comes from an object to be photographed and reaches an incident surface of the prism 91 along the first optical axis O1 is reflected by a reflecting surface of the prism 91 along a direction of the second optical axis O2 to exit. Then, the light beam passes through the first lens set 40, the second lens set 50, the third lens set 60, and the fourth lens set 70 that are disposed on the second optical axis O2, to form an image on an imaging surface of the imaging element 81.

The second lens set 50 and the third lens set 60 function as zoom lenses that change an image magnification by moving along a direction of an optical axis of the imaging optical system.

In addition, the fourth lens set 70 functions as autofocus lenses that performs focus adjustment by moving along the direction of the optical axis of the imaging optical system.

As shown in FIG. 11 and FIG. 12, the camera device 100 includes a prism anti-shake unit 90, an imaging lens set unit 10, and an imaging element unit 80. Further, the imaging lens set unit 10 includes an imaging lens set housing unit 20 and an imaging lens set holder unit 30. The prism anti-shake unit 90 is fixed above the imaging lens set unit 10, the imaging element unit 80 is fixed below the imaging lens set unit 10, and the front and rear sides of the imaging lens set unit 10 are covered with a front side cover plate 11 and a rear side cover plate 12. In this way, a camera device 100 is formed.

Figure 9:
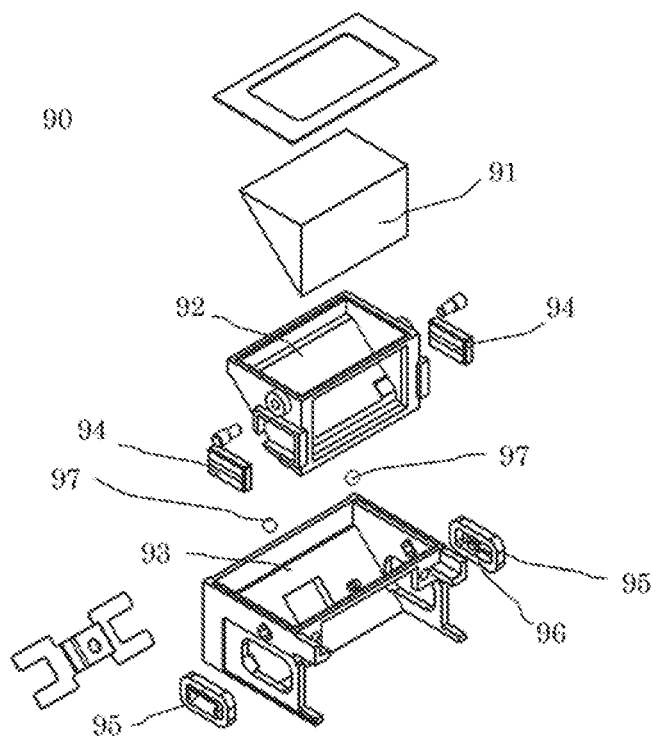
FIG. 9 is an isometric exploded view of a prism anti-shake unit of a camera device as viewed from the lower according to an embodiment of the present invention.
Figure 10:
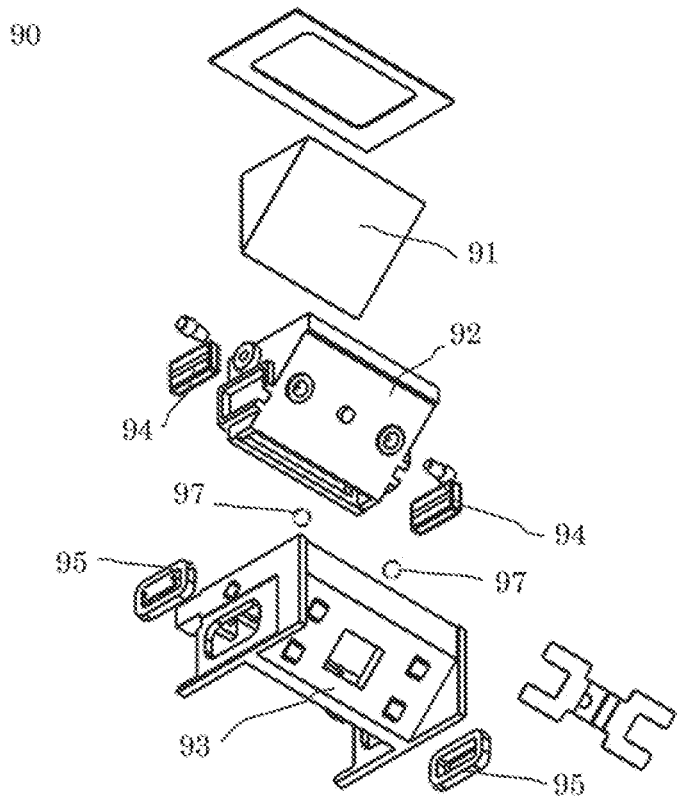
FIG. 10 is an isometric exploded view of a prism anti-shake unit of a camera device as viewed from the top according to an embodiment of the present invention.

As shown in FIG. 9 and FIG. 10, the prism anti-shake unit 90 is configured to be rotatable about an axis perpendicular to a plane formed by the optical axis of the imaging lens sets and the reflected optical axis of the object side by the prism 91.

Two coils 95 for anti-shake of the prism and one Hall sensor 96 for anti-shake of the prism connected to a flexible substrate (not shown) are fixed to a substrate 93 for anti-shake of the prism, and form a coil motor together with two permanent magnets 94 for anti-shake of the prism fixed to the prism holder 92.

In addition, the prism holder 92 to which the prism 91 is fixed becomes a rotation shaft by two balls 97 for anti-shake of the prism between the substrate 93 for anti-shake of the prism and the prism holder 92.

In the imaging element unit 80, the imaging element 81 mounted to the imaging element substrate 82 is fixed to the imaging element holder 83, and the imaging element unit 80 is fixed below the imaging lens set unit 10.

The imaging lens set unit 10 is divided into an imaging lens set housing unit 20 and an imaging lens set holder unit 30.

Two stepping motors 22 are fixed to the imaging lens set housing unit 20 by screws 28, respectively.

Figure 19:
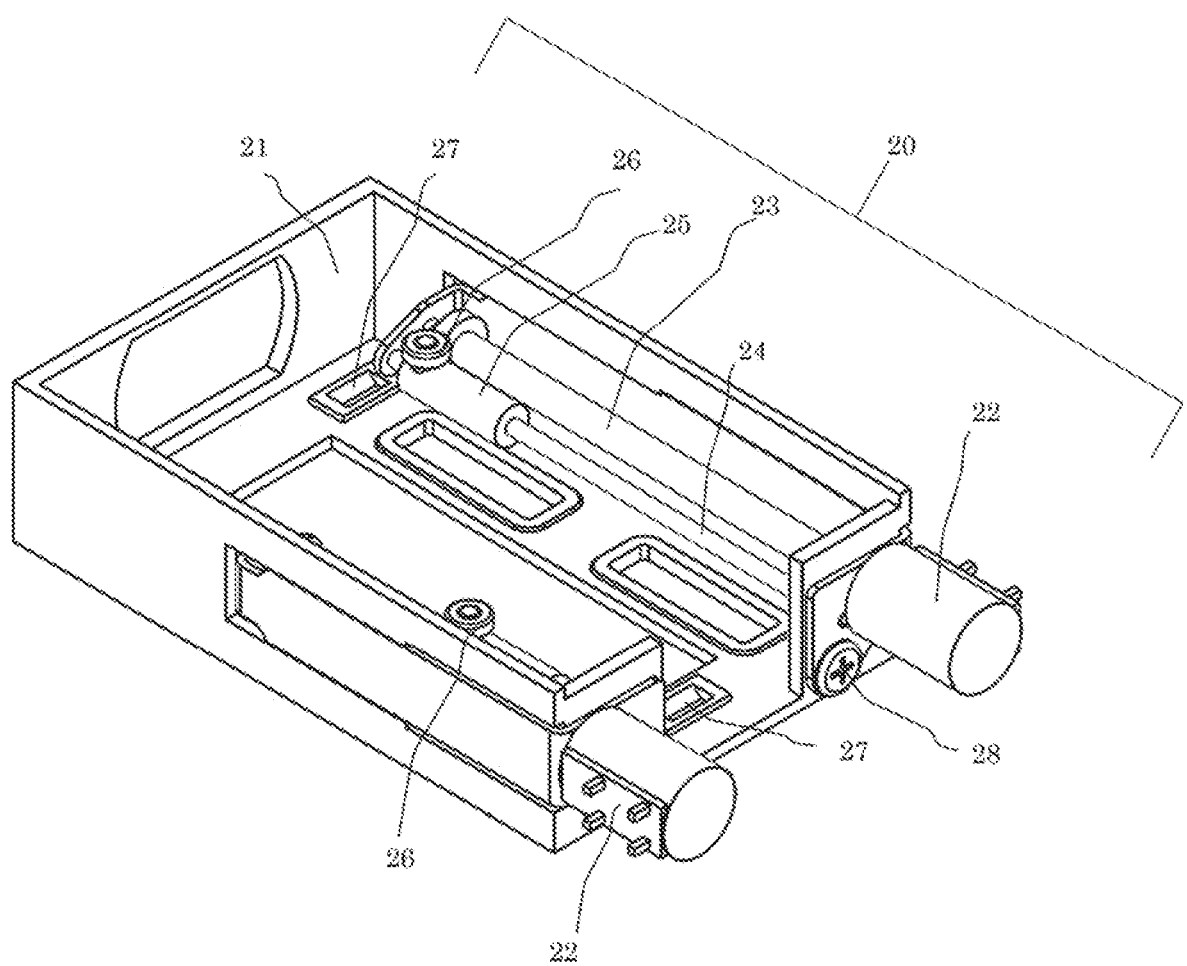
FIG. 19 is an isometric view of an imaging lens set housing unit of a camera device as viewed from the lower front according to an embodiment of the present invention.
Figure 20:
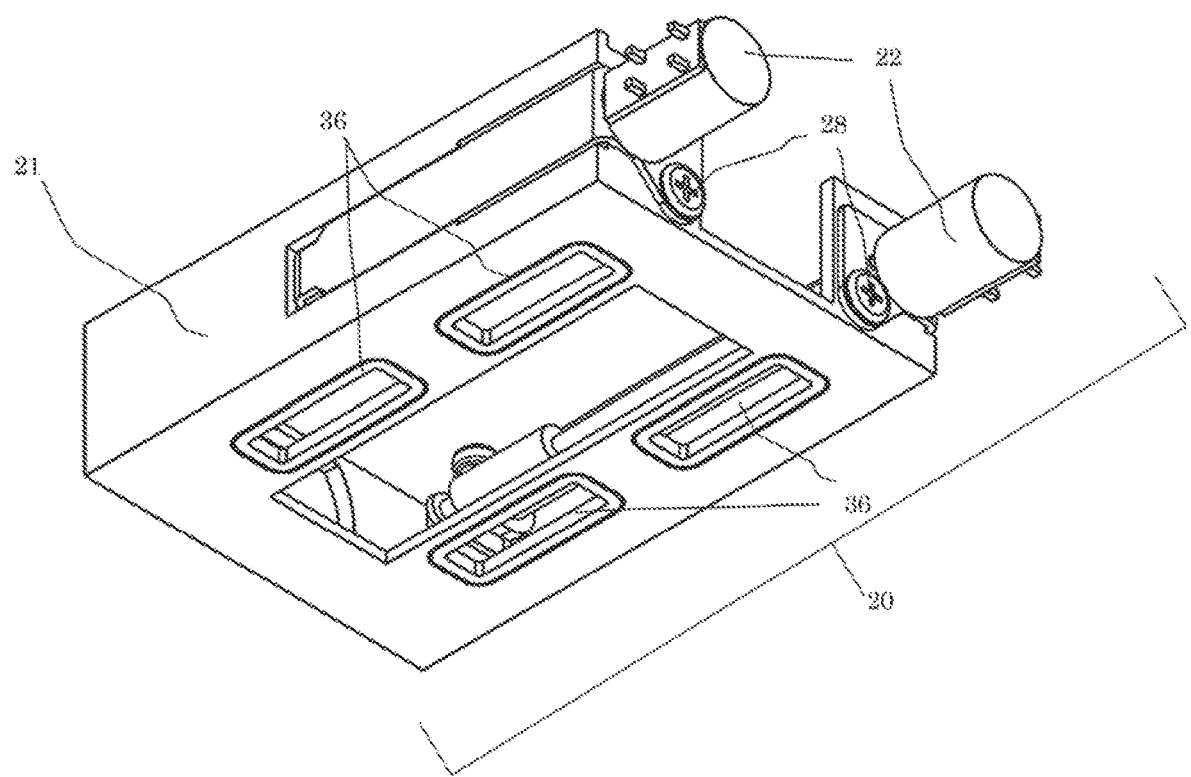
FIG. 20 is an isometric view of an imaging lens set housing unit of a camera device as viewed from the lower rear according to an embodiment of the present invention.
Figure 21:
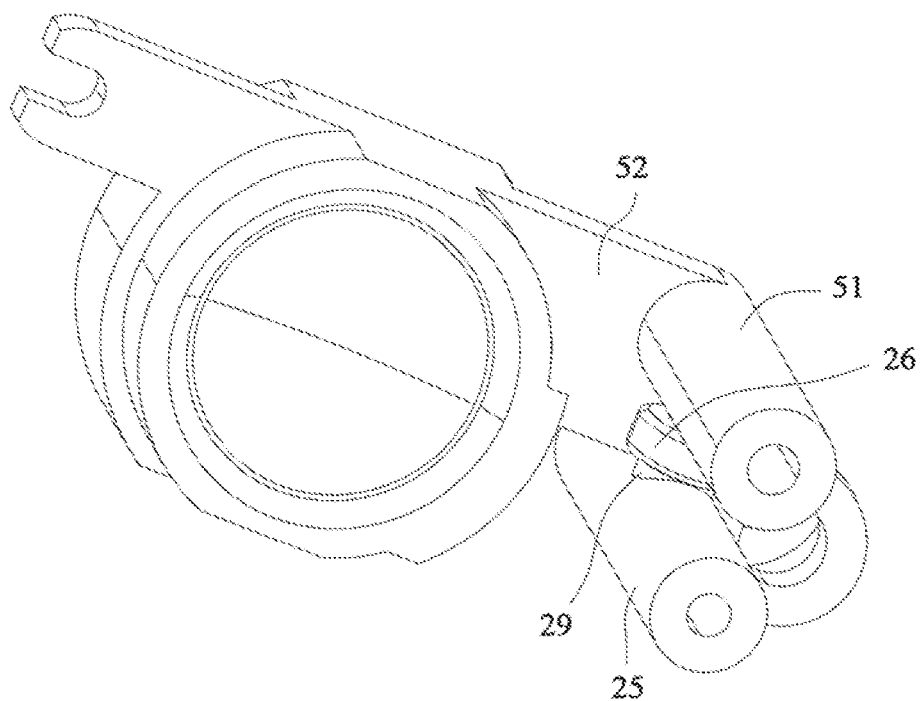
FIG. 21 is a schematic diagram of an abutting portion abutting against a roller part.
Figure 22:
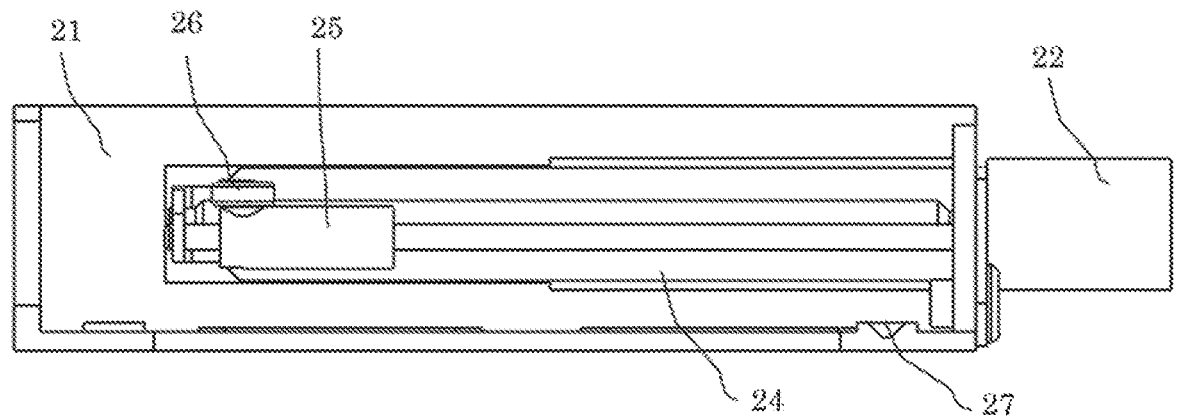
FIG. 22 is a cross-sectional view of an imaging lens set housing unit of a camera device in a cross-sectional plane formed by a first optical axis and a second optical axis according to an embodiment of the present invention.
Figure 23:
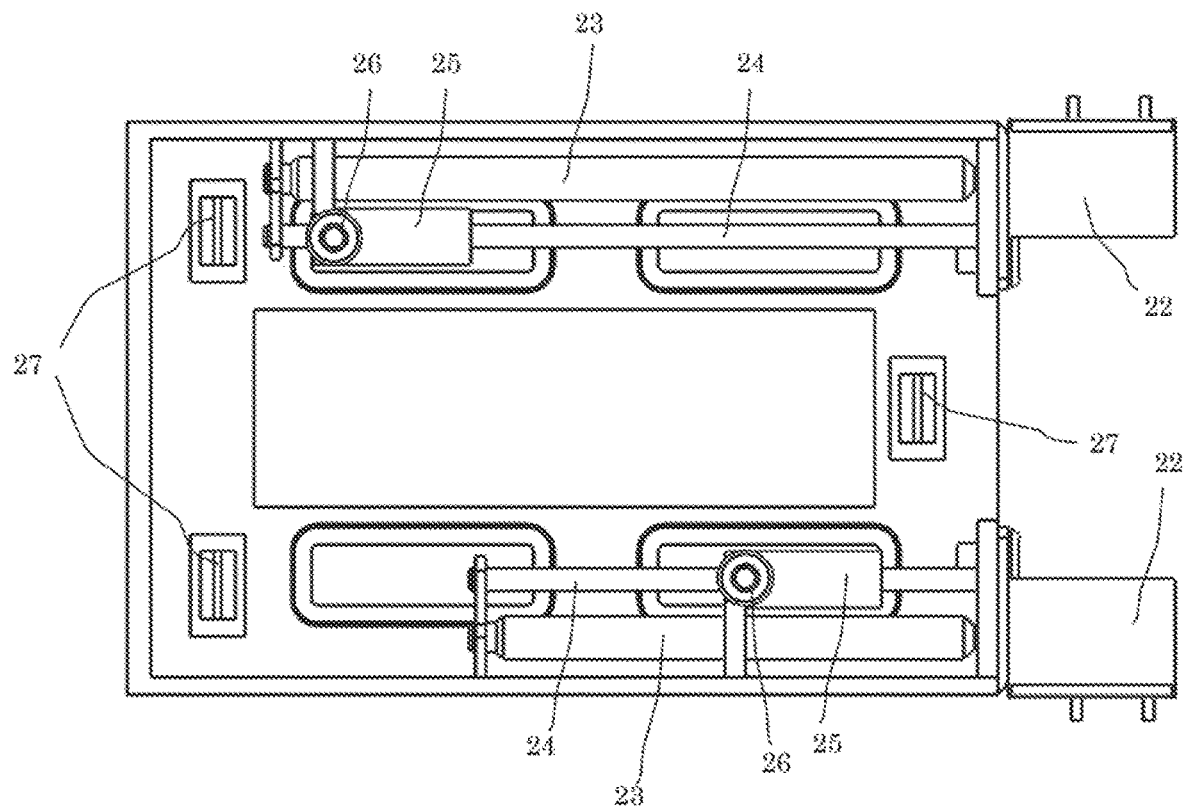
FIG. 23 is a view of an imaging lens set housing unit of a camera device as viewed from the front according to an embodiment of the present invention.
Figure 24:
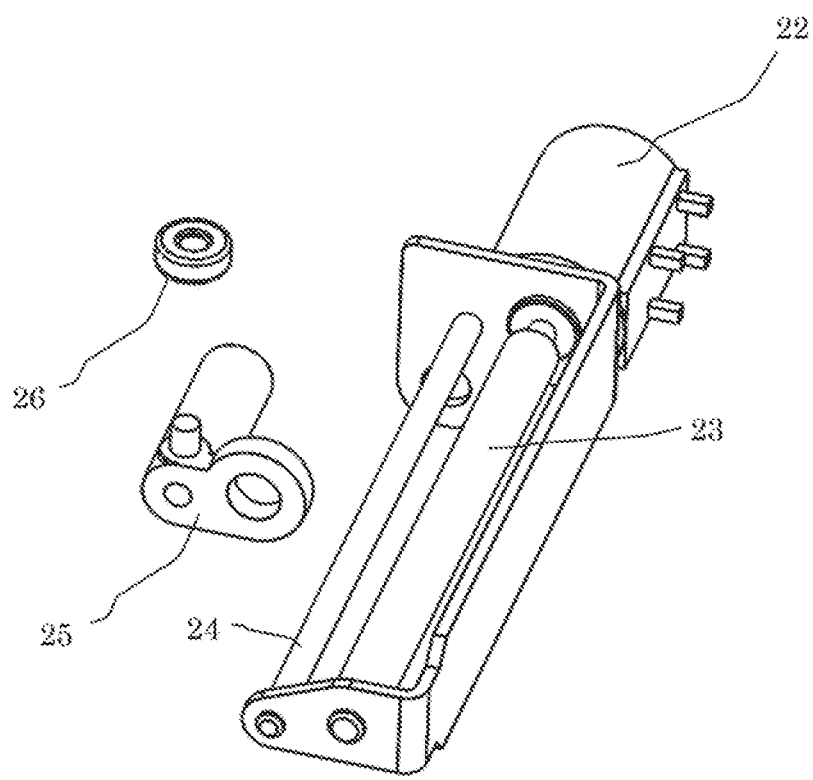
FIG. 24 is an isometric view of a stepping motor of a camera device according to an embodiment of the present invention.

As shown in FIG. 19, an output shaft of the stepping motor 22 becomes a leading screw 23, and a nut guide shaft 24 that is parallel to the leading screw 23 is integrally fixed to a flange.

The motor includes a nut part 25 which is configured to move the imaging lens sets constituting the zoom in parallel with the optical axis, and abuts against the abutting portion 52 of the imaging lens set frame holding the imaging lens set by means of the roller part 26 for reducing friction.

The nut part 25 is formed by a female screw screwed with the leading screw 23 and a hole with the nut guide shaft 24 as a straight guide, and therefore can move parallel to the shaft of the leading screw 23 by rotation of the stepping motor 22.

In addition, a rotation column 29 in a direction perpendicular to the axis of the leading screw 23 is integrally formed on the nut part 25, and a roller part 26 is provided in a manner that the roller part 26 can rotate with the rotation column 29 as a rotation axis.

The second lens set 50 is taken as an example, and of course, it can also be implemented on the third lens set 60. With reference to FIGS. 3, 7, 19, and 21, the stepping motor 22 drives the nut guide shaft 24 to move, which drives the nut part 25 to move along the optical axis, so that the roller part 26 can move while abutting against the abutting portion 52, which drives the second lens set 50 to zoom.

Preferably, the abutting portion 52 includes an abutting surface, and the abutting surface is configured to abut against the roller part 26.

Figure 8:
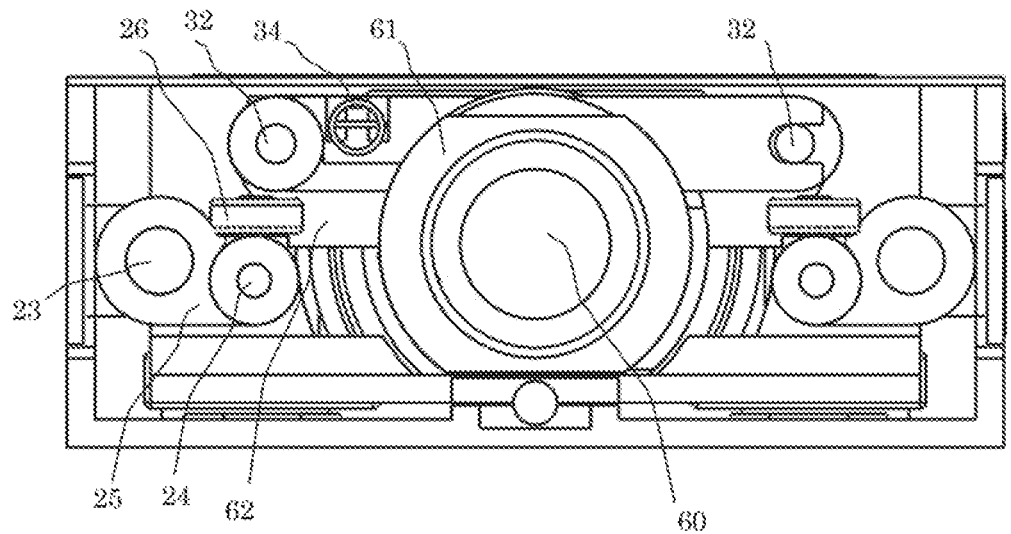
FIG. 8 is a cross-sectional view along S2-S2 shown in FIG. 5 and is a view, viewed from the lower, of a holder for a third lens set and a roller.

With reference to FIG. 8, the third lens set 60 includes an abutting portion 62, which can abut against the roller part 26 of the third lens set.

The imaging lens set holder 31 holds the first lens set 40, the second lens set 50, the third lens set 60, and the fourth lens set 70.

In the imaging lens set holder 31, two shafts 32 are fixed in parallel with the optical axis of the imaging lens sets, and the first lens set frame 41 is fixed with the shafts 32 as a reference. In addition, the second lens set 50 and the third lens set 60 functioning as the zoom lenses are held at the second lens set frame 51 and the third lens set frame 61, respectively, in such a manner that they can move along a direction of the optical axis of the imaging lens sets with the shafts 32 as a reference.

In a specific embodiment, the camera device further includes a spring, which is disposed between the holding frame and the imaging lens set frame, so as to enable the imaging lens set frame to zoom stably.

Figure 5:
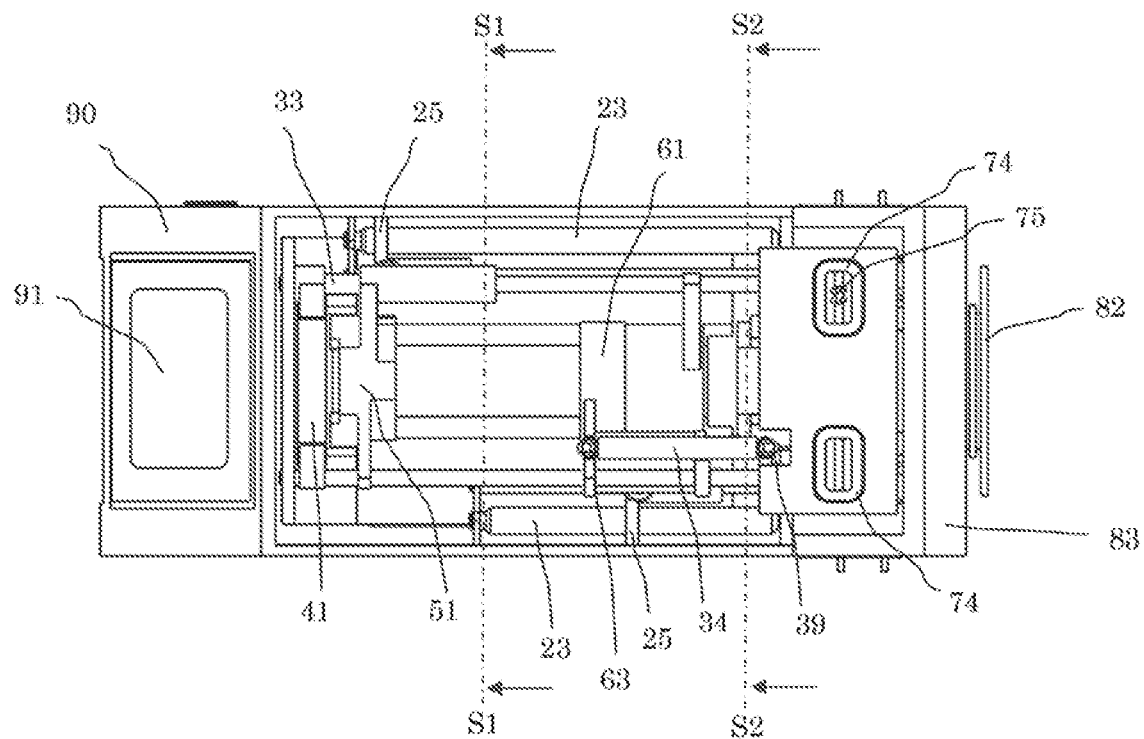
FIG. 5 is a diagram of a camera device as viewed from the front, with a front side cover plate and a rear side cover plate being removed according to an embodiment of the present invention.
Figure 6:
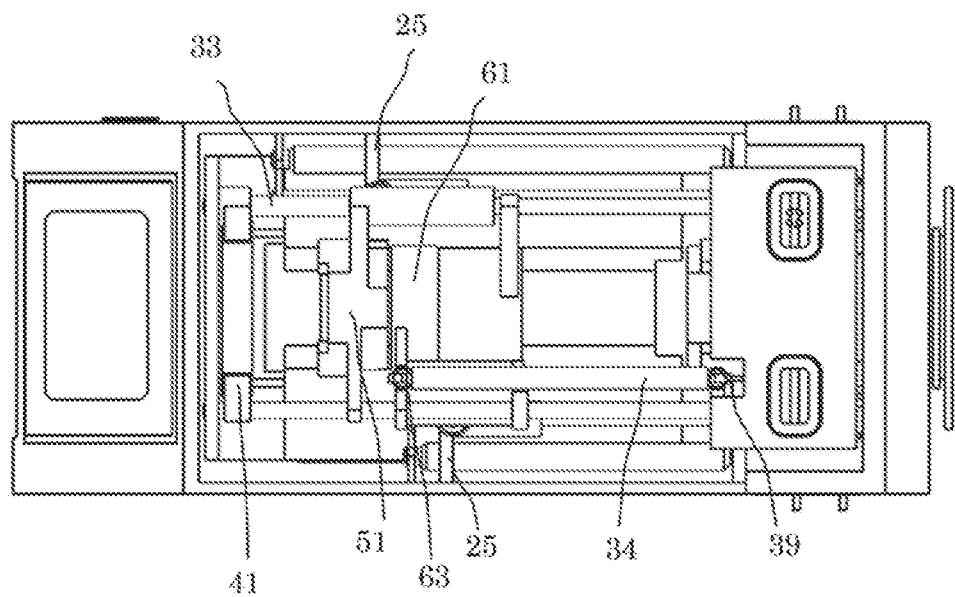
FIG. 6 is a diagram of a camera device as viewed from the front, with a front side cover plate and a rear side cover plate being removed and a zoom lens being moved according to an embodiment of the present invention.
Figure 7:
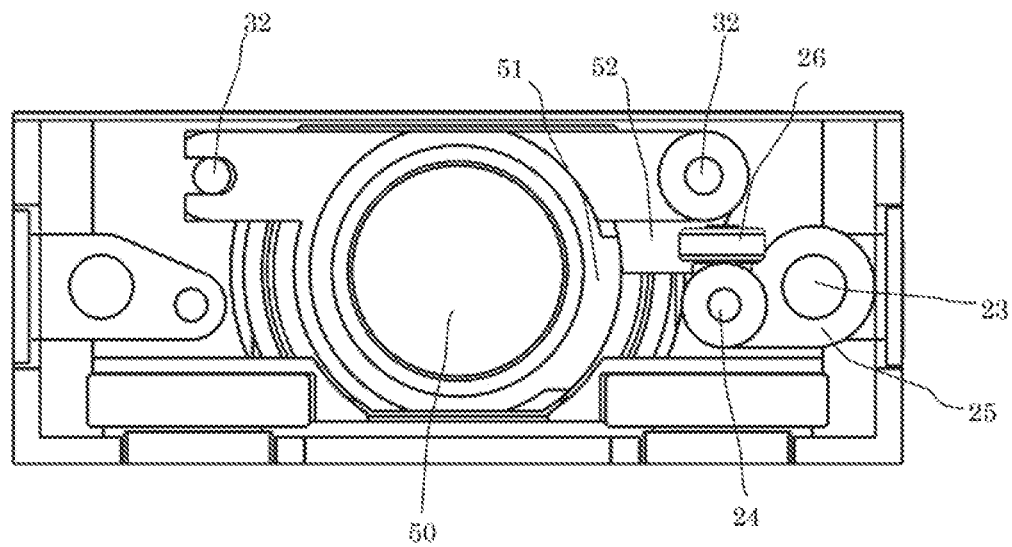
FIG. 7 is a cross-sectional view along S1-S1 shown in FIG. 5 and is a view, viewed from the lower, of a holder for a second lens set and a roller.

Taking the second lens set 50 as an example, a spring can be used to achieve a pushing force or a pulling force, which matches an abutting force of the roller part 26, so as to achieve zooming of the lens set in different directions along the optical axis. The spring may include a compression spring 33 as shown in FIG. 5 and FIG. 6 and a tension spring 34 as shown in FIG. 8.

In addition, the second lens set frame 51 is arranged on a support portion of the shaft 32 with the shaft 32 passing through an inner diameter of the compression spring 33, and the third lens set frame 61 is disposed adjacent to the support portion of the shaft 32, and the tension spring 34 is hung on a pawl 63 of the third lens set frame 61 and a pawl 39 of the imaging lens set holder, so that each lens set frame applies a force toward an image side.

This becomes a force acting in a direction in which the roller part 26 disposed on the nut part 25 of the leading screw 23 mounted on the stepping motor 22 abuts, thereby preventing each zoom lens set frame from leaving the roller part 26 due to posture.

The fourth lens set 70 has an auto-focus function, and focus adjustment thereof can be performed by moving the fourth lens set frame 71 that holds the fourth lens set 70 along a direction of the optical axis of the imaging lens set.

The fourth lens set frame 71 and two permanent magnets 73 for autofocus of the fourth lens set are fixed to a fourth lens set frame holder 72. Two coils 74 for autofocus of the fourth lens set and a Hall sensor 75 for autofocus of the fourth lens set which are connected to a flexible substrate (not shown) are fixed to the imaging lens set holder 31, thereby forming a voice coil motor.

In addition, three balls 76 for autofocus of the fourth lens set are arranged at three V slots 77 of the fourth lens set frame holder and three V slots 38 for autofocus of the imaging lens set holder, thereby being movable parallel to the optical axis.

The imaging lens set holder unit 30 is assembled from the front with respect to the imaging lens set housing unit 20. However, three balls 37 for autofocus of the imaging lens set are arranged at three V slots 27 of the image lens set housing and three V slots 38A of the imaging lens set holder, so that the imaging lens set holder unit 30 moves with low friction only in left and right directions.

Four permanent magnets 35 for anti-shake of the imaging lens set are fixed to the imaging lens set holder 31.

Four coils 36 for anti-shake of the imaging lens set connected to a flexible substrate (not shown) are fixed to the imaging lens set housing 21, and form a voice coil motor together with the four permanent magnets 35 for anti-shake of the imaging lens set fixed to the imaging lens set holder 31, so as to form an electromagnetic actuator that performs anti-shake driving in the left and right directions.

The roller part 26 disposed on the nut part 25 of the leading screw 23 mounted on the stepping motor 22, the second lens set frame 51, and the third lens set frame 61 each can always move by following the nut part 25 by forces of the compression spring 33 and the tension spring 34. During the zooming operation, the driving force of the motor and an elastic force of the spring act together, so that the zooming operation is performed stably.

In addition, even if the imaging lens set holder unit 30 moves in the left and right directions by the hand shake correction action, since the roller part 26 can rotate about the rotation column 29, the abutting portion 52 of the second lens set frame 51 can roll in relative to the roller part 26, thereby reducing friction. Regardless of a position of the imaging lens set holder unit 30, the second lens set frame 51 and the third lens set frame 61 can stably perform anti-shake operations.

The above-mentioned roller part 26 can be used alone to cooperate with the abutting portion 52 (or the abutting portion 62) to achieve zooming of the lens set by an abutting force. The above-mentioned roller part 26 can also be used alone for relative rolling between the roller part 26 and the abutting portion 52 (or the abutting portion 62) when the hand shakes, so that the lens set will not shake.

Zoom and anti-shake can be performed separately, and they can also be performed simultaneously when shooting movies.

In this embodiment, the above-mentioned prism 91 may be a reflector (not shown).

Figure 25:
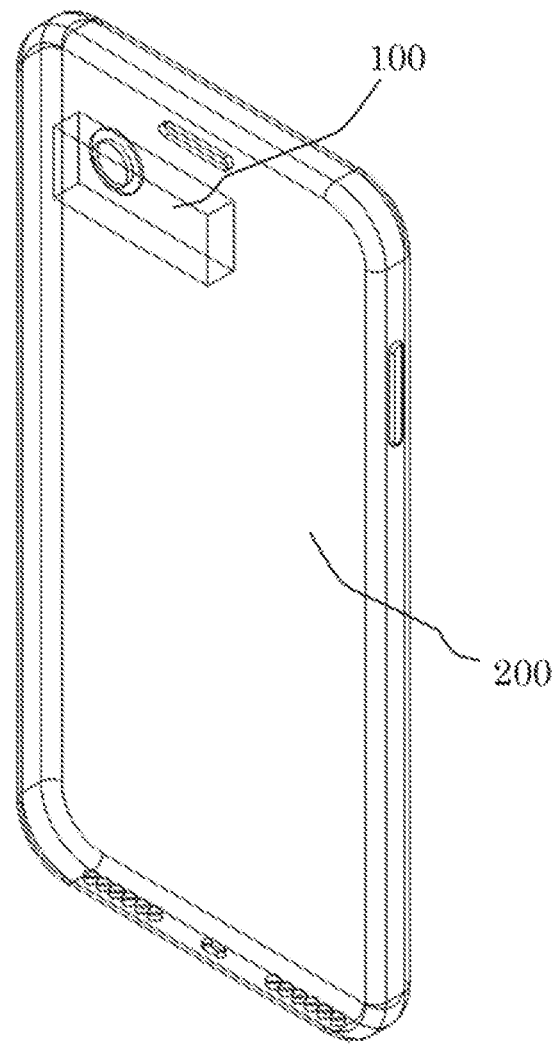
FIG. 25 illustrates a portable electronic device (portable information terminal) containing a camera device according to the present invention.

The above-mentioned camera device 100 may also be used in the camera device 100 for portable information equipment 200, such as smart phone, a feature phone, or a tablet device, as shown in FIG. 25.

The above description has described preferred embodiments of the present invention, and a protection scope of the present invention is not limited to these embodiments. Any equivalent modifications or changes made by those skilled in the art based on the present invention shall fall into the inventions defined by claims of the present invention.

REFERENCE NUMERALS

10 . . . imaging lens set unit
11 . . . front side cover plate
12 . . . rear side cover plate
20 . . . imaging lens set housing unit
21 . . . imaging lens set housing
22 . . . stepping motor
23 . . . leading screw
24 . . . nut guide shaft
25 . . . nut part
26 . . . roller part
27 . . . V slot of the imaging lens set housing
28 . . . screw
29 . . . rotation column
30 . . . imaging lens set holder unit
31 . . . imaging lens set holder
32 . . . shaft
33 . . . compression spring
34 . . . tension spring
35 . . . permanent magnet for anti-shake of imaging lens set
36 . . . coil for anti-shake of imaging lens set
37 . . . ball for anti-shake of imaging lens set
38A . . . V slot for anti-shake of imaging lens set holder
38B . . . V slot for autofocus of the imaging lens set holder
39 . . . pawl of imaging lens set holder
40 . . . first lens set
41 . . . first lens set frame
50 . . . second lens set
51 . . . second lens set frame
52 . . . abutting portion of the second lens set frame for abutting against the roller part
60 . . . third lens set
61 . . . third lens set frame
62 . . . abutting portion of the third lens set frame for abutting against the roller part
63 . . . pawl of third lens set frame
70 . . . fourth lens set
71 . . . fourth lens set frame
72 . . . fourth lens set frame holder
73 . . . permanent magnet for autofocus of fourth lens set
74 . . . coil for autofocus of fourth lens set
75 . . . Hall sensor for autofocus of fourth lens set
76 . . . ball for autofocus of fourth lens set
77 . . . V slot of the fourth lens set frame holder
80 . . . imaging element unit
81 . . . imaging element
82 . . . imaging element substrate
83 . . . imaging element holder
90 . . . prism anti-shake unit
91 . . . prism
92 . . . prism holder
93 . . . substrate for anti-shake of the prism
94 . . . permanent magnet for anti-shake of the prism
95 . . . coil for anti-shake of the prism
96 . . . Hall sensor for anti-shake of the prism
97 . . . ball for anti-shake of the prism
100 . . . camera device
200 . . . portable information equipment
O1 . . . first optical axis
O2 . . . second optical axis

What is claimed is:

1. An camera device with a hand shake correction function, wherein the camera device is an optical system, comprising a reflecting part having a reflecting surface configured to deflect an optical axis, and hand shake correction is performed according to a shake applied to the optical system, wherein
an imaging lens set unit is a zoom optical system configured to change an image magnification by changing a spacing between partial lens sets;
the reflecting part is disposed closer to an object side than the imaging lens set unit; image shake of a first axis which is perpendicular to a plane formed by an optical axis of the imaging lens set unit and a reflected optical axis of the object side by the reflecting part is corrected by rotation of the reflecting part; and image shake of a second axis which is parallel to the reflected optical axis of the object side is corrected by moving the imaging lens set unit comprising the zoom optical system as a whole along a direction perpendicular to the optical axis of the imaging lens set unit; wherein
the imaging lens set unit is held at a holding frame which is movable in the direction perpendicular to the optical axis of the imaging lens set unit by an electromagnetic actuator; a lens set constituting zoom in the imaging lens set unit is movable in parallel with the optical axis of the imaging lens set unit by a motor,
wherein the motor is not fixed to the holding frame.

2. The camera device as described in claim 1, wherein the motor is a stepping motor.

3. The camera device as described in claim 2, wherein the motor comprises a nut part for moving the imaging lens set constituting the zoom in parallel with the optical axis, and the nut part abuts against an abutting portion of an imaging lens set frame that holds the imaging lens set through a roller part for reducing friction.

4. The camera device as described in claim 3, wherein
the imaging lens set unit comprises a second lens set and a third lens set which function as zoom lenses,
the second lens set and the third lens set are moved in parallel with the optical axis by the nut part of the motor, and
the nut part respectively abuts against an abutting portion of the second lens set frame that holds the second lens set and an abutting portion of the third lens set frame that holds the third lens set through a roller part which is rotatably mounted to the nut part.

5. The camera device as described in claim 4, wherein the abutting portion has an abutting surface configured to abut against the roller part.

6. The camera device as described in claim 5, wherein a rotation column is provided on the nut part, and the roller part is arranged at the rotation column.

7. The camera device as described in claim 6, further comprising one or more springs, wherein the one or more springs are disposed between the holding frame and the imaging lens set frame for making the imaging lens set frame zoom stably.

8. The camera device as described in claim 7, wherein the one or more springs comprise a tension spring and a compression spring, wherein
the tension spring is arranged between the third lens set frame and the holding frame; and
the compression spring is arranged between the second lens set frame and the holding frame.

9. The camera device according to claim 1, wherein the imaging lens set unit held at the holding frame comprises a lens set having an autofocus function.

10. The camera device as described in claim 1, wherein the electromagnetic actuator is configured to drive the imaging lens set unit as a whole to move in the direction perpendicular to the optical axis of the imaging lens set unit, and configured to drive the reflecting part to rotate.

11. The camera device as described in claim 10, wherein the electromagnetic actuator is a voice coil motor.

12. The camera device as described in claim 1, wherein the reflecting part is a prism.

13. A camera, comprising the camera device as described in claim 1.

14. A portable electronic equipment, comprising the camera as described in claim 13.

\* \* \* \* \*